(No Model.)

2 Sheets—Sheet 1.

N. W. PRATT.
MANIFOLD FOR SECTIONAL BOILERS.

No. 343,727. Patented June 15, 1886.

WITNESSES:
Aug Creveling
P. R. Waterbury

INVENTOR
Nat. W. Pratt
BY
Chas. W. Forbes
ATTORNEY

N. PETERS, Photo-Lithographer, Washington, D. C.

(No Model.) 2 Sheets—Sheet 2.

N. W. PRATT.
MANIFOLD FOR SECTIONAL BOILERS.

No. 343,727. Patented June 15, 1886.

WITNESSES:
Aug Crevling
P. R. Waterbury

INVENTOR
Nat W. Pratt
BY
Chas. N. Forbes
ATTORNEY

UNITED STATES PATENT OFFICE.

NAT. W. PRATT, OF BROOKLYN, NEW YORK.

MANIFOLD FOR SECTIONAL BOILERS.

SPECIFICATION forming part of Letters Patent No. 343,727, dated June 15, 1886.

Application filed January 12, 1886. Serial No. 188,289. (No model.)

*To all whom it may concern:*

Be it known that I, NAT. W. PRATT, a citizen of the United States, residing at Brooklyn, in the county of Kings and State of New York, have invented a new and useful Improvement in Manifolds or Headers for Sectional Steam-Generators and other Purposes, of which the following is a specification, reference being had to the accompanying drawings, forming a part of the same, in which—

Figure 2:
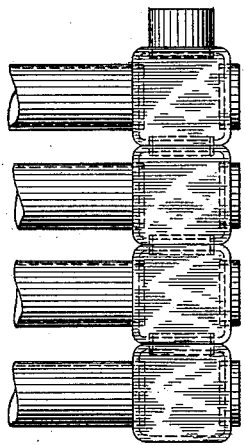
Figure 1:
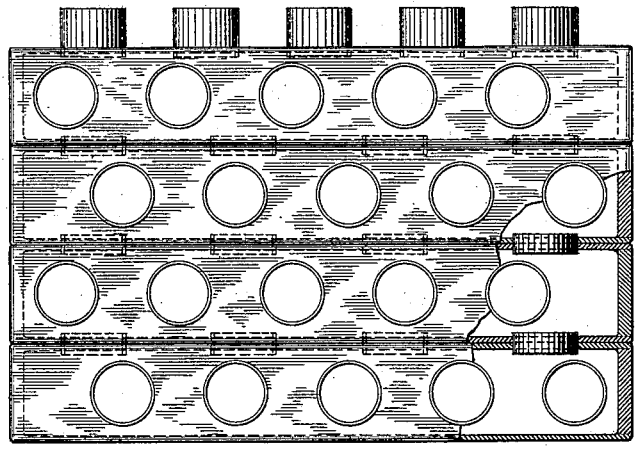
Figure 3:
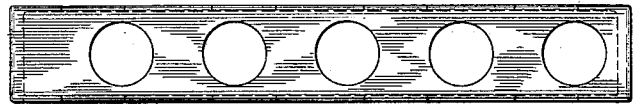
Figure 4:
Figure 5:
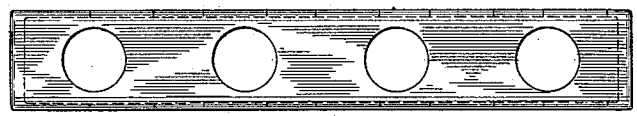

Figure 1 is an end elevation of a series of manifolds or headers as arranged in a generator, the figure being partly broken away to show the connecting-nipples. Fig. 2 is a side elevation of the same, showing a portion of the connected heating-tubes. Figs. 3, 4, and 5 are side and end views of the manifold detached. Figs. 6, 7, 8, 9, 10, and 11 are side elevations of a serpentine form of manifold, showing various modifications of construction of the same.

This invention consists in a manifold or header composed of a seamless tube of wrought-iron or other ductile material, constructed in polygonal form in cross-section and in straight or crooked form longitudinally.

I have but recently reduced the present invention to practice, owing to the difficulty in making such seamless tubes of a size essential to a manifold or header for use in sectional steam-generators, and I am not aware that this has ever before been accomplished.

The method of forming the straight headers, as shown in Figs. 1, 2, 3, 4, and 5, consists in placing a polygonal mandrel within a cylindrical tube of the desired size and then subjecting the same to compression either between power-formers arranged opposite each flat surface of the mandrel and moved transversely to the longitudinal axis of the blank, or by passing the blank and mandrel longitudinally between similarly-arranged rollers, whereby the blank will be flattened simultaneously upon its respective sides.

The serpentine form illustrated in Figs. 6, 7, 8, 9, 10, and 11 is produced by first subjecting a cylindrical blank containing a square mandrel to compression between upper and lower dies constructed with plain faces, which changes the blank to an oblong form in cross-section. The square mandrel is then removed and a sectional mandrel substituted, having two of its opposite sides constructed with flat parallel faces and the adjacent opposite sides constructed with depressions corresponding to the serpentine form required. This mandrel is made up of sectional parts or pieces that are held together and in place by a central core or bar constructed with inclined or beveled surfaces that act upon the sectional parts of the mandrel to retain the same in position. The upper and lower dies with plain faces, before referred to, are now adjusted against the flat sides of the blank and side dies having depressions on their acting faces corresponding to the projecting surface of the serpentine faces of the mandrel are forced together and produce the corresponding serpentine form of blank, the upper and lower dies retaining the blank in position until the action of the side dies is completed. By relaxing and withdrawing the central core or bar of the mandrel it collapses, and the several sections of the latter are thereby released and may be removed from the crooked interior of the blank. This latter method of producing the serpentine headers forms, substantially, the subject-matter of a separate and independent application filed by me November 13, 1885, No. 182,665, and I intend that such application shall issue simultaneously herewith.

Figure 6:
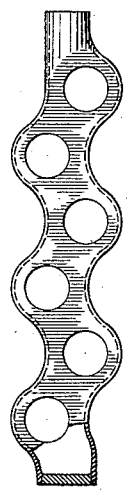
Figure 7:
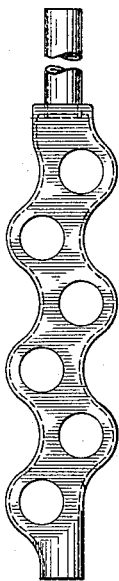
Figure 8:
Figure 9:
Figure 10:
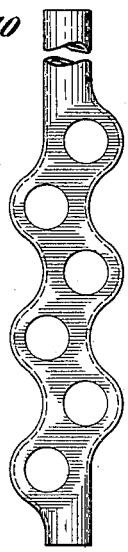
Figure 11:

The usual method of connecting a series of these headers together and to adjacent parts—as shown, for example, in Figs. 1 and 2—is by means of separate expanded nipples; but with this particular kind of header the ends of the same may be drawn, as shown in Figs. 6, 7, 10, and 11, whereby the nipple is formed as an integral part of the header, and may be expanded directly to an adjacent part, and when desired the end of the headers may be closed by welding it together, as shown in Fig. 9, or welding in a separate piece, as shown in Fig. 6. Therefore What I herein claim, and desire to secure by Letters Patent, is—

1. A manifold or header composed of a seamless tube of wrought-iron or other ductile material, constructed in polygonal form in cross-section.

2. A manifold or header composed of a seamless serpentine tube of wrought-iron or other ductile material, constructed in polygonal form in cross-section.

NAT. W. PRATT.

Witnesses:
C. W. FORBES,
AUG. CREVELING.